(12) United States Patent
Quigley et al.

(10) Patent No.: US 6,772,640 B1
(45) Date of Patent: Aug. 10, 2004

(54) MULTI-TEMPERATURE HEATER FOR USE WITH PRESSURE TRANSDUCERS

(75) Inventors: Claudia J. Quigley, Lexington, MA (US); Kerry S. Lahey, Litchfield, NH (US); Santhi E. Mathew, Londonderry, NH (US); J. Robert Maxwell, Jr., Londonderry, NH (US); Leonid Mindlin, South Natick, MA (US); James M. Poulin, Derry, NH (US); Gardy St. Paul, Everett, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 09/685,154

(22) Filed: Oct. 10, 2000

(51) Int. Cl.[7] .............................................. G01L 9/12
(52) U.S. Cl. .............................. 73/718; 73/724; 73/708; 73/756
(58) Field of Search ........................ 73/319, 718, 724, 73/728, 708, 756, 204; 428/220; 361/283, 283.1–283.4; 335/131, 132; 588/252, 256; 480/220; 219/444, 481

(56) References Cited

U.S. PATENT DOCUMENTS

| | | | |
|---|---|---|---|
| 2,416,557 A | 2/1947 | Wiener | 179/180 |
| 2,751,530 A | 6/1956 | Armstrong | 317/246 |
| 2,753,515 A | 7/1956 | Rickner | 323/74 |
| 2,755,419 A | 7/1956 | Hollmann | 317/249 |
| 2,907,320 A | 10/1959 | Weese et al. | 128/2 |
| 2,999,386 A | 9/1961 | Wolfe | 73/398 |
| 3,000,215 A | 9/1961 | Atanasoff et al. | 73/398 |
| 3,113,459 A | 12/1963 | Slater | 73/398 |
| 3,243,998 A | 4/1966 | Vosteen | 73/141 |
| 3,318,153 A | 5/1967 | Lode | 73/798 |
| 3,354,721 A | 11/1967 | Fiske | 73/398 |
| 3,619,742 A | 11/1971 | Rud, Jr. | 317/246 |
| 3,620,083 A | 11/1971 | Dimeff et al. | 73/398 |
| 3,968,695 A | * 7/1976 | Weiss et al. | 73/863.11 |
| 4,084,438 A | 4/1978 | Lee et al. | 73/706 |

(List continued on next page.)

FOREIGN PATENT DOCUMENTS

GB      2188155      9/1987

OTHER PUBLICATIONS

Baratron® Absolute Pressure Transmitters 400 Series, ©1996 MKS Instruments,Inc., Andover, MA.
Barateon® General Purpose Absolute Pressure Transducers, 1993 MKS Instruments, Inc.
Beynon, J.D.E. et al, "A Simple Micromanometer", Journal of Scientific Instruments, vol. 41, No. 2, Feb. 1964, pp. 111–112.
Cook, D.B. et al, "A Simple Diaphragm Micromanometer", Journal of Scientific Instruments, vol. 30, Jul. 1953, pp. 238–239.

*Primary Examiner*—Andrew H. Hirshfield
*Assistant Examiner*—Marissa Ferguson
(74) *Attorney, Agent, or Firm*—Wilmer Cutler Pickering Hale and Dorr LLP

(57) ABSTRACT

A heater is disclosed for use with pressure transducers. The disclosed heater includes a first heating element and a second heating element. The first heating element is characterized by a first electrical resistance. The second heating element is characterized by a second electrical resistance. In preferred embodiments, the first electrical resistance is different than the second electrical resistance. The disclosed heater can be used to accurately heat a pressure transducer to at least four different operating temperatures by selectively (a) connecting the first heating element to the transducer temperature control circuitry, (b) connecting the second heating element to the transducer temperature control circuitry, (c) connecting the first and second heating elements in series with the transducer temperature control circuitry, or (d) connecting the first and second heating elements in parallel with the transducer temperature control circuitry.

25 Claims, 6 Drawing Sheets

U.S. PATENT DOCUMENTS

| | | | |
|---|---|---|---|
| 4,120,206 A | 10/1978 | Rud, Jr. | 73/718 |
| 4,136,603 A | 1/1979 | Doyle, Jr. | 92/98 R |
| 4,168,517 A | 9/1979 | Lee | 361/283 |
| 4,168,518 A | 9/1979 | Lee | 361/283 |
| 4,176,557 A * | 12/1979 | Johnston | 73/708 |
| 4,229,776 A | 10/1980 | Antikainen et al. | 361/283 |
| 4,358,814 A | 11/1982 | Lee et al. | 361/283 |
| 4,424,713 A | 1/1984 | Kroninger, Jr. et al. | 73/718 |
| 4,434,203 A | 2/1984 | Briefer | 428/152 |
| 4,567,773 A | 2/1986 | Cooper et al. | 73/708 |
| 4,679,643 A | 7/1987 | Bové | 177/210 |
| 4,735,090 A | 4/1988 | Jeffrey et al. | 73/706 |
| 4,785,669 A | 11/1988 | Benson et al. | 73/718 |
| 4,823,603 A | 4/1989 | Ferran et al. | 73/724 |
| 4,977,480 A | 12/1990 | Nishihara | 361/283 |
| 5,005,421 A | 4/1991 | Hegner et al. | 73/72 |
| 5,020,377 A | 6/1991 | Park | 73/718 |
| 5,150,275 A | 9/1992 | Lee et al. | 361/283 |
| 5,155,653 A | 10/1992 | Kremidas | 361/283 |
| 5,279,163 A | 1/1994 | D'Antonio et al. | 73/728 |
| 5,442,962 A | 8/1995 | Lee | 73/718 |
| 5,499,533 A | 3/1996 | Miller et al. | 73/152 |
| 5,541,561 A * | 7/1996 | Grunert et al. | 335/132 |
| 5,542,300 A | 8/1996 | Lee | 73/724 |
| 5,603,684 A * | 2/1997 | Wetmore et al. | 588/252 |
| 5,604,315 A | 2/1997 | Briefer et al. | 73/861 |
| 5,625,152 A | 4/1997 | Pandorf et al. | 73/756 |
| 5,836,063 A | 11/1998 | Hegner et al. | 73/718 |
| 5,911,162 A | 6/1999 | Denner | 73/718 |
| 5,925,824 A | 7/1999 | Soma et al. | 73/718 |
| 5,932,332 A * | 8/1999 | Pandorf et al. | 428/220 |
| 5,939,639 A | 8/1999 | Lethbridge | 73/724 |
| 5,965,821 A | 10/1999 | Grudien | 73/724 |
| 6,029,525 A | 2/2000 | Grudzien | 73/718 |
| 6,105,436 A | 8/2000 | Lischer et al. | 73/724 |
| 6,423,949 B1 * | 7/2002 | Chen et al. | 219/444.1 |

* cited by examiner

MULTI-TEMPERATURE HEATER FOR USE WITH PRESSURE TRANSDUCERS

FIELD OF THE INVENTION

The present invention relates to an improved heater for use with heated pressure transducers. More particularly, the present invention relates to an improved method for converting a pressure transducer configured for operating at a first temperature to a pressure transducer configured for operating at a second temperature, or for configuring a pressure transducer to operate at one or more temperatures.

BACKGROUND OF THE INVENTION

FIG. 1 shows a sectional view of a prior art heated capacitive pressure transducer 100. Transducer 100 includes several major components such as an external shell 110, a heater shell 120, a heater 130, a capacitive pressure sensor 140, a front end electronics assembly 160, a heater control electronics assembly 170, and an input/output (I/O) electronics assembly 180. As will be discussed in greater detail below, transducer 100 generates an output signal indicative of a pressure measured by sensor 140.

For convenience of illustration, many mechanical details of transducer 100, such as the construction of sensor 140 and the mounting of sensor 140 and electronics assemblies 160, 170, 180, have been omitted from FIG. 1. However, heated capacitive pressure transducers such as transducer 100 are well known and are described for example in U.S. Pat. No. 5,625,152 (Pandorf); U.S. Pat. No. 5,911,162 (Denner); and U.S. Pat. No. 6,029,525 (Grudzien).

Briefly, external shell 110 includes a lower enclosure 112, an upper electronics enclosure 114, and a joiner 116 that holds enclosures 112, 114 together. Heater shell 120 is disposed within the lower enclosure 112 and includes a lower enclosure or can 122 and a cover 124. Heater 130 includes a barrel heater 132 and an end heater 134. Barrel heater 132 is wrapped around the external cylindrical sidewall of can 122 and end heater 134 is disposed on the bottom of can 122. Barrel heater 132 and end heater 134 are electrically connected via wires 136 so the two heaters 132, 134 may be simultaneously controlled via a single electrical signal. Sensor 140 and front end electronics assembly 160 are disposed within heater shell 120. Heater control electronics assembly 170 and I/O electronics assembly 180 are disposed within the upper electronics enclosure 114. A temperature sensor (e.g., a thermistor) 190 is fixed to an internal surface of heater shell 120.

Sensor 140 includes a metallic, flexible, diaphragm 142 and a pressure tube 144. Tube 144 extends from an area proximal to the diaphragm through the heater shell 120, and through the lower sensor enclosure 112. The lower, or external, end of tube 144 is generally coupled to a source of fluid (not shown). Pressure of fluid in the source is communicated via tube 144 to the lower surface of diaphragm 142 and the diaphragm 142 flexes up or down in response to changes in pressure within tube 144. Diaphragm 142 and a reference conductive plate of sensor 140 form a capacitor, and the capacitance of that capacitor varies in accordance with movement or flexion of the diaphragm. Accordingly, that capacitance is indicative of the pressure within tube 144. Front end electronics assembly 160 and I/O electronics assembly 180 cooperatively generate an output signal representative of the capacitance of sensor 140 which is, of course, also representative of the pressure within tube 144. I/O electronics assembly 180 makes that output signal available to the environment external to transducer 100 via an electronic connector 182.

FIG. 2 shows one example of how a capacitive pressure sensor 140 can be constructed. Capacitive pressure sensors of the type shown in FIG. 2 are discussed in greater detail in U.S. Pat. No. 6,029,525 (Grudzien). The sensor 140 shown in FIG. 2 includes a circular, conductive, metallic, flexible diaphragm 142, a pressure tube 144, and an electrode 246. Electrode 246 and diaphragm 142 are mounted within a housing 248. Electrode 246 includes a ceramic block 250 and a conductive plate 252. The ceramic block 250 is rigidly mounted to the housing 248 so that a bottom face of block 250 is generally parallel to, and spaced apart from, the diaphragm. The bottom face of block 250 is normally planar and circular. The conductive plate 252 is deposited onto the bottom face of block 250 and is also generally parallel to, and spaced apart from, the diaphragm. Conductive plate 252 and diaphragm 142 form two plates of a variable capacitor 254. The capacitance of capacitor 254 is determined in part by the gap, or spacing between, the diaphragm 142 and the conductive plate 252. Since the diaphragm flexes up and down (thereby changing the spacing between diaphragm 142 and conductive plate 252) in response to pressure changes in tube 144, the capacitance of capacitor 254 is indicative of the pressure within tube 144.

FIG. 2 shows only one of the many known ways of configuring a capacitive pressure sensor 140. However, capacitive pressure sensors 140 generally include one or more conductors that are held in spaced relation to a flexible, conductive, diaphragm. The diaphragm and the conductors form plates of one or more variable capacitors and the capacitance of those capacitors varies according to a function of the pressure in tube 144.

Returning to FIG. 1, ideally, the output signal of transducer 100 varies only according to changes in the pressure of the fluid in tube 144. However, changes in the temperature of transducer 100, or temperature gradients within transducer 100, can affect the output signal. This is primarily due to the different coefficients of thermal expansion of different materials used to construct the sensor 140. A secondary effect relates to the temperature sensitive performance of front end electronics 160. Accordingly, the accuracy of transducer 100 can be adversely affected by temperature changes in the ambient environment.

To minimize the adverse effect of changing ambient temperature, the temperature sensitive components of transducer 100 (i.e., sensor 140 and front end electronics 160) are disposed within heater shell 120, and in operation the heater 130 heats the heater shell 120 to a controlled, constant temperature. Heater 130 and heater shell 120 essentially form a temperature controlled oven that maintains the temperature of the temperature sensitive components at a constant preselected value.

Heater 130 is normally formed by placing wires or traces (e.g., copper) characterized by a selected electrical resistance onto a flexible, electrically insulating, thermally conductive shell. The traces are selected so that they will heat the heater shell 120 to a preselected temperature when a particular electrical signal is applied to the traces. The electrically insulating, thermally conductive shell is commonly made from thin layers of silicone rubber or Kapton (i.e., a polyimide high temperature film sold by Dupont under the trade name Kapton).

FIG. 1A shows a front view of a prior art barrel heater 132. As shown, the heater includes a heating element 132A that has been placed on an electrically insulating, thermally conductive shell 132B. Heater element 132A includes a resistive wire 132C disposed between two terminals 132D, 132E. The amount of heat produced by heating element 132A is primarily determined by the electric resistance provided between terminals 132D, 132E and the electric signal applied to the terminals 132D, 132E. End heater 134 is constructed in a similar fashion as barrel heater 132.

Heater 130 is normally permanently bonded to the external surface of heater shell 120 as indicated in FIG. 1. Heaters made using Kapton shells are normally bonded to the external surface of shell 120 with pressure sensitive adhesive. Heaters made using rubber shells are normally bonded to the external surface of shell 120 using a high temperature "Vulcanization" process that bonds the layer of rubber directly to the surface of shell 120. Rubber shell heaters are preferred for many applications because the adhesives used to bond Kapton heaters to the shell 120 tend to dry out, and thereby loose their bonding qualities, when exposed to high temperatures (e.g., one hundred fifty degrees Celsius).

In operation, heater control electronics assembly 170 applies an electrical signal to heater 130 via wires 172. Heater control electronics assembly 170 normally includes components for monitoring the temperature of heater shell 120 via sensor 190 and adjusting the signal applied to heater 130 so as to maintain the shell 120 at a constant temperature.

One popular form of heater control electronics assembly 170 includes (1) a plus/minus fifteen volt direct current power supply and (2) components for generating from the direct current supply an alternating current signal that swings between plus and minus fifteen volts. Assembly 170 normally applies via wires 172 (1) a minus fifteen volt reference signal to a first terminal of the heater 130 and (2) the alternating current signal to a second terminal of the heater 130. When the signal applied to the second terminal is equal to plus fifteen volts, maximum power is being applied to the heater and when that signal is equal to minus fifteen volts, no power is being applied to the heater. Assembly 170 may also include pulse width modulation controller circuitry for controlling the pulse width of the alternating current signal applied to the second terminal of heater 130. By modifying the pulse width and thereby adjusting the duty cycle of the pulse width modulated signal, this controller circuitry modifies the electrical power applied to the heater. This controller circuitry modifies the duty cycle in accordance with the temperature of shell 120 as measured by sensor 190 so as to maintain the temperature of shell 120 at a constant value. For example, when the heater is initially activated and the shell is at an ambient temperature, the signal applied to the second terminal may be a constant value of plus fifteen volts (i.e., a one hundred percent duty cycle signal). Such a signal applies maximum power to the heater so as to heat the shell to the desired operating temperature as fast as possible. As another example, once the heater shell has reached the desired operating temperature, assembly 170 may reduce the duty cycle of the signal applied to the second terminal to fifty percent (e.g., so that signal equals plus fifteen volts half the time and equals minus fifteen volts the rest of the time). In general, assembly 170 adjusts the duty cycle of the signal applied to the second terminal of the heater as needed to maintain the heater shell at the desired operating temperature. For convenience of exposition, application of power to the heater as discussed above shall be discussed herein in terms of applying an alternating current pulse width modulated signal to the heater.

One problem with prior art heated pressure transducers is that there is no easy way to convert a T1 transducer (i.e., a transducer configured for operation at a temperature T1, for example one hundred degrees) into a T2 transducer (i.e., a transducer configured for operation at a temperature T2, for example forty-five degrees). Once a particular heater 130 is bonded to the shell 120 and the transducer 100 has been assembled, the transducer 100 is effectively permanently associated with a particular temperature. For example, if a one hundred degree Celsius heater 130 (e.g., a heater that will generate a temperature of one hundred degrees Celsius when a pulse width modulated signal that swings between plus and minus fifteen volts is applied to the heater) is bonded to the shell 120 of a transducer 100, that transducer 100 is normally called a "one hundred degree Celsius pressure transducer".

Since the heater 130 is permanently bonded to the shell 120, converting a T1 transducer to a T2 transducer generally involves (1) disassembling the transducer 100; (2) discarding the original heater shell and replacing it with a new heater shell to which a T2 heater has been permanently affixed; and (3) reassembling the transducer 100. This process is undesirably complex.

Another method of converting a T1 transducer to a T2 transducer is to use the pulse width modulation controller in electronics assembly 170 to adjust the electric signal applied to the heater 130 so as to heat the heater shell 130 to T2 instead of T1. Although such control is possible, it is generally too imprecise to be practical. For example, a heater that generates a temperature of one hundred degrees Celsius when a plus/minus fifteen volt, pulse width modulated signal is applied to the heater is capable of generating an average temperature of forty-five degrees (or any other average temperature value that is greater than ambient and less than one hundred degrees) Celsius if the duty cycle of the pulse width modulated voltage signal applied to the heater is appropriately adjusted. However, although adjusting the duty cycle of the pulse width modulated voltage signal can cause the heater to generate an average temperature of forty-five degrees, the instantaneous temperature of the heater will normally oscillate above and below forty-five degrees by as much as several degrees. So, although the pulse width modulation controller in electronics assembly 170 provides a sufficient degree of control to maintain a T1 heater at temperature T1 while the ambient temperature is changing, the amount of control provided by that controller is generally not sufficient to permit using a T1 heater to generate a constant temperature of T2. Heated pressure transducers operate most accurately when their temperature sensitive components are heated to a constant temperature, rather than to a temperature that oscillates by relative large amounts around an average value. Ideally, the temperature of the heater shell oscillates around the desired temperature value by no more than one tenth of a degree Celsius. Accordingly, using such electronic control to convert a T1 transducer to a T2 transducer is generally not practical.

Another method of converting a T1 transducer to a T2 transducer is to include additional components in heater control electronics assembly 170 (e.g., additional power supplies or controllers that are more sophisticated than the pulse width modulation controller discussed above) and to use those components to appropriately adjust the electric signal applied to the heater. However, it is generally preferred to use only very simple, compact circuitry in transducer 100, and such additional components would require more space, more circuitry, consume more power, and generate more heat than is desirable.

Accordingly, it would be advantageous to provide less expensive and more accurate methods and structures for converting a T1 pressure transducer to a T2 pressure transducer.

SUMMARY OF THE INVENTION

These and other objects are provided by an improved heater for use with pressure transducers. The heater includes a first heating element and a second heating element. The first heating element provides a first electrical resistance and the second heating element provides a second electrical resistance. In preferred embodiments, the first resistance is different than the second resistance.

If each of the two heating elements provides a different electrical resistance, each of the two elements will be associated with a different, unique, operating temperature. This allows the amount of heat that is produced by the heater to be selectively changed simply by changing the electrical connections between the heater and the electronic circuitry of the pressure transducer. More specifically, the heater can be electrically connected to the pressure transducer in at least four different configurations, and each configuration is associated with a unique operating temperature. The pressure transducer can be heated to a temperature of (a) T1 by connecting the first heating element in series with the heater control electronics assembly so that the heater provides an electrical resistance of R1; (b) T2 by connecting the second heating element in series with the heater control electronics assembly so that the heater provides an electrical resistance of R2; (c) T3 by connecting the first and second heating elements in series with the heater control electronics assembly so that the heater provides an electrical resistance of R3; and (d) T4 by connecting the first and second heating elements in parallel with the heater control electronics assembly so that the heater provides an electrical resistance of R4.

Each of the multiple operating temperatures provided by the invention is achieved by using the heater to provide a different, unique, electrical resistance. This stands in contrast to prior art methods of providing multiple operating temperatures like using a heater that provides a single electrical resistance and electronic controllers for varying the signal applied to the heaters. Whereas prior art methods produce a temperature that oscillates around the desired operating temperature by as much as several degrees Celsius, a heater constructed according to the invention may be used to provide a transducer that can selectively operate at any one of multiple operating temperatures without deviating from any of the selected operating temperatures by more than a tenth of a degree Celsius.

Some benefits of the invention may be obtained simply by using a new heater constructed according to the invention with prior art pressure transducers. In other words, other than changing the heater, prior art pressure transducers need not be modified in any way to obtain benefits of the invention. For example, the same electronic circuitry used to control the heater of a prior art heated pressure transducer may be used to control heaters constructed according to the invention.

However, additional benefits of the invention can be obtained by making minor modifications to the electronic circuitry of a prior art heated pressure transducer. For example, in addition to providing a pressure transducer capable of operating at multiple temperatures, the invention may be used to decrease the "warm up" time (i.e., the time required to heat the heater shell from the temperature of the ambient environment to the operating temperature) of a pressure transducer. For example, if the first heating element is associated with the temperature T1 and the second heating element is associated with the temperature T2, where T1 is higher than T2, the warm up time for a T2 transducer may be decreased in accordance with the invention by using the first heating element to heat the heater shell from the temperature of the ambient environment to the temperature T2 and thereafter using the second heating element to maintain the temperature of the heater shell at T2. Since T1 is higher than T2, the first heating element (the T1 heater) normally generates more heat than the second heating element (the T2 heater), and using the T1 heater in this fashion decreases the transducer's warm up time (since it applies more heat to the heater shell during the warm up time). To use this method of decreasing the warm up time, the electronic circuitry in the transducer preferably includes components for selectively switching between electrically connecting the first heating element to the heater control electronics and electrically connecting the second heating element to the heater control electronics. Also, the electronic circuitry of the transducer is preferably capable of switching between the first and second heating element based on the temperature of the heater shell as measured by a temperature sensor.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein.

DETAILED DESCRIPTION OF THE PREFERRED EMBODIMENTS

Figure 3A:
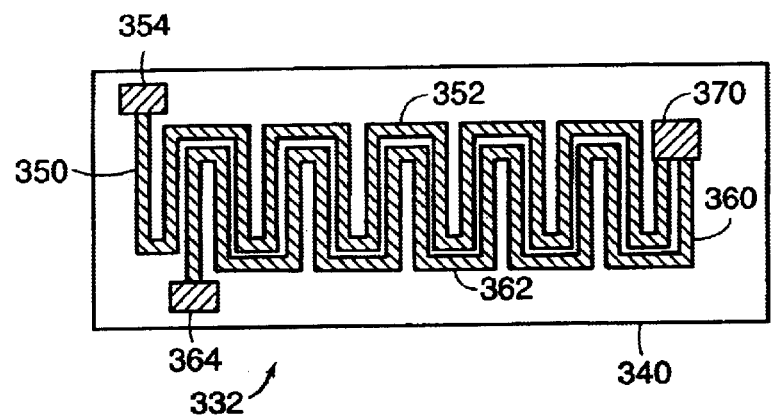
FIGS. 3A and 3B show front and top views, respectively, of a barrel heater constructed according to the invention.
Figure 3B:
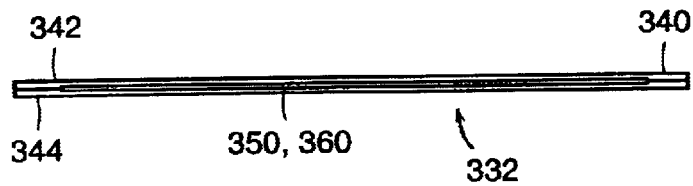

FIGS. 3A and 3B show front and top views, respectively, of an improved barrel heater 332 constructed according to the invention. Heater 332 includes an electrically insulating, thermally conducting shell 340, a first electrically resistive heater element 350, and a second electrically resistive heater element 360. As shown in FIG. 3B, shell 340 includes a first electrically insulating, thermally conducting layer 342 and a second electrically insulating, thermally conducting layer 344. Heater elements 350 and 360 are sandwiched between layers 342, 344. Layers 342, 344 are preferably formed from rubber or Kapton.

Figure 1:
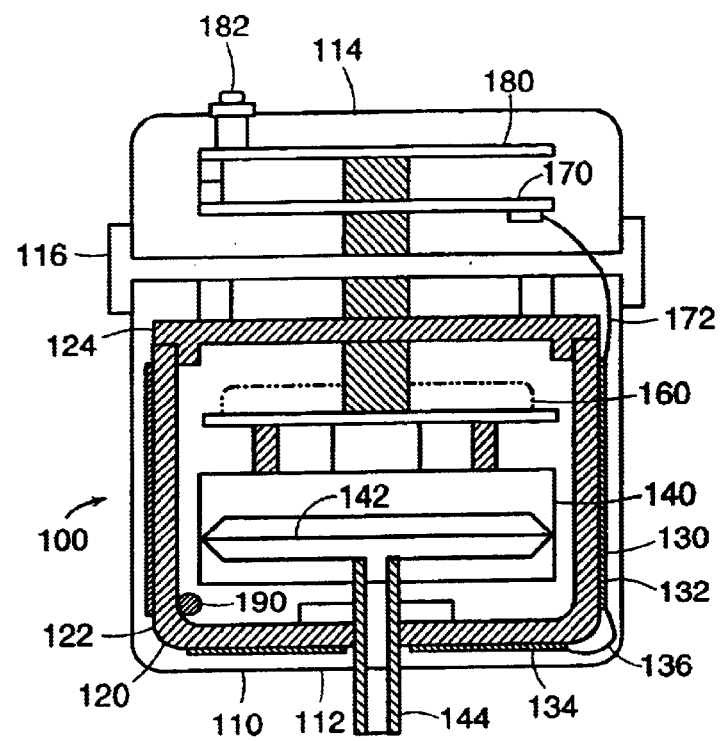
FIG. 1 shows a sectional view of a prior art heated capacitive pressure transducer.
Figure 1A:
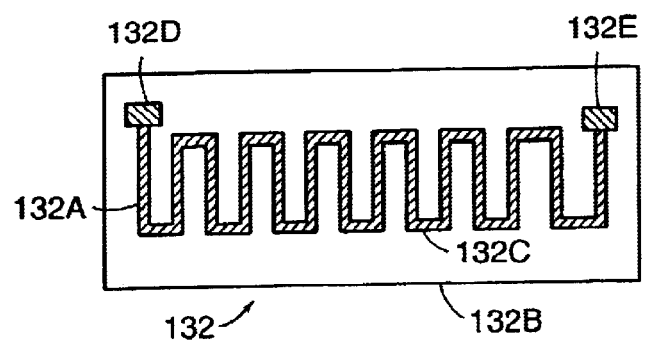
FIG. 1A shows a front view of the prior art heater shown in FIG. 1.
Figure 2:
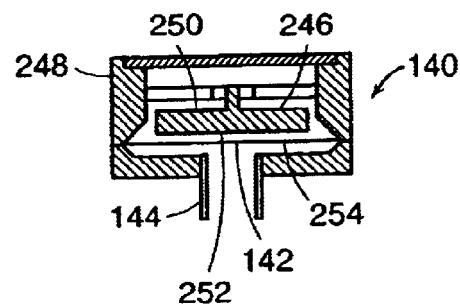
FIG. 2 shows a sectional view of a prior art capacitive pressure sensor.

As shown in FIG. 3A, element 350 includes an electrically resistive wire, or trace, 352 that is disposed between, and electrically connected to, two electrically conductive terminals 354, 370. Similarly, element 360 includes an electrically resistive wire, or trace, 362 that is disposed between, and electrically connected to, two electrically conductive terminals 364, 370. Element 350 is characterized by a first electrical resistance RA (i.e., the electrical resistance between terminals 354 and 370 is equal to RA Ohms) and element 360 is characterized by a second electrical resistance RB (i.e., the electrical resistance between terminals 364 and 370 is equal to R2 Ohms). Unlike prior art barrel heater 132 (shown in FIG. 1A), which includes only a single heating element, barrel heater 332 constructed according to the invention includes two heating elements, each of the heating elements being characterized by a different electric resistance.

Figure 3C:
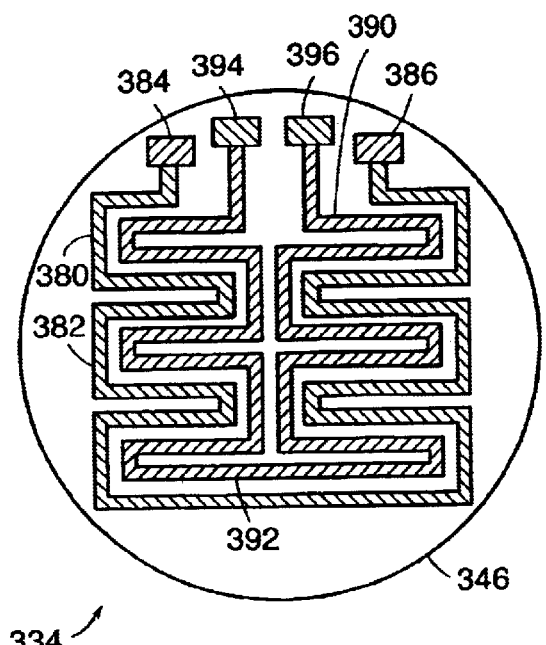
FIG. 3C shows a front view of an end heater constructed according to the invention.

FIG. 3C shows a front view of an end heater 334 constructed according to the invention. Heater 334 includes an electrically insulating, thermally conducting shell 346, a third electrically resistive heater element 380, and a fourth electrically resistive heater element 390. Heater element 380 includes an electrically resistive wire, or trace, 382 that is disposed between, and electrically connected to, two electrically conductive terminals 384, 386. Heater element 390 includes an electrically resistive wire, or trace, 392 that is disposed between, and electrically connected to, two electrically conductive terminals 394, 396. Element 380 is characterized by a third electrical resistance RC (i.e., the electrical resistance between terminals 384 and 386 is equal to R3 Ohms) and element 390 is characterized by a fourth electrical resistance RD (i.e., the electrical resistance between terminals 384 and 386 is equal to RD Ohms). Elements 380 and 390 are preferably sandwiched between layers of electrically insulating, thermally conducting shell 346 as in the case of heater 332 as shown in FIG. 3B.

Figure 3D:
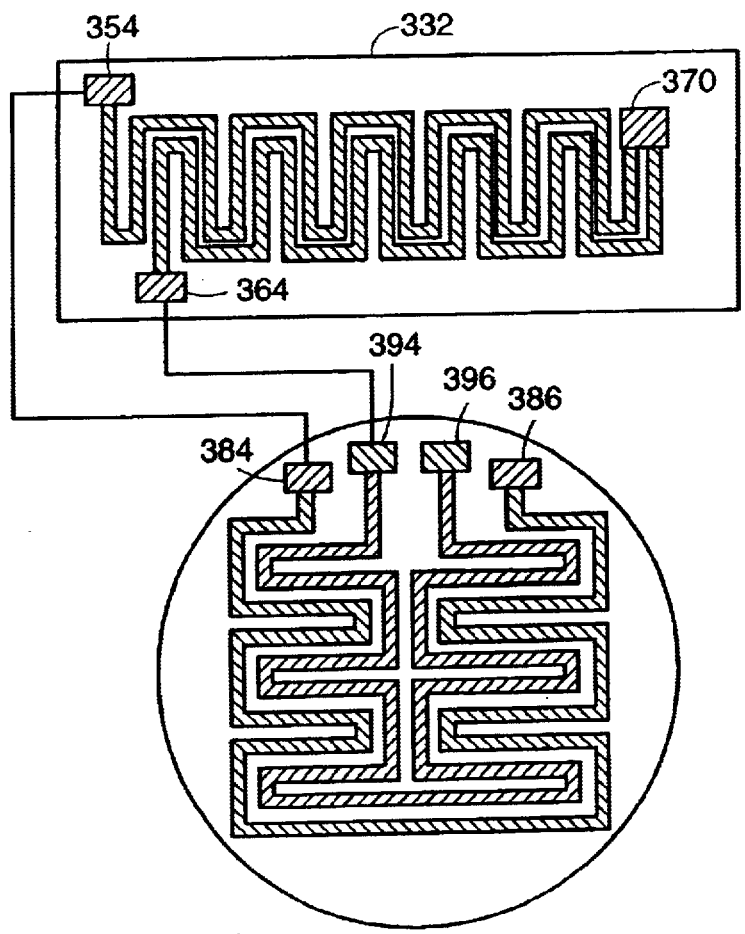
FIG. 3D shows a preferred method of electrically connecting the heaters shown in FIGS. 3A and 3C together.

FIG. 3D shows a preferred way of electrically connecting barrel heater 332 and end heater 334. As shown, terminals 354 and 384 are electrically connected together and terminals 364 and 394 are electrically connected together. This leaves terminals 386, 396, and 370 for making electrical connections to the electronics assemblies of a pressure transducer.

Figure 3E:
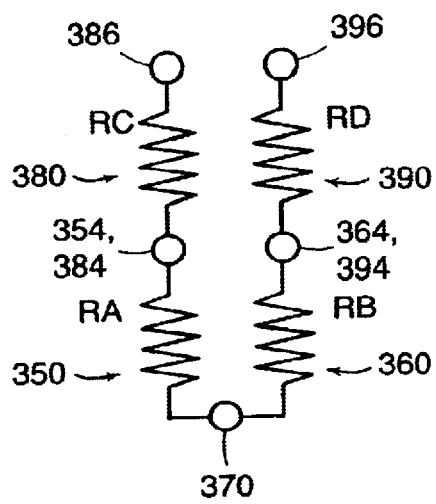
FIGS. 3E and 3F show schematic representations of the electric configuration shown in FIG. 3D.
Figure 3F:
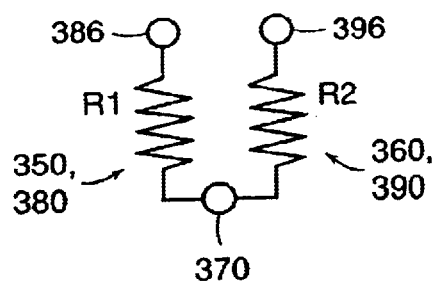

FIG. 3E shows an electrical schematic representation of the configuration shown in FIG. 3D. Finally, FIG. 3F shows an electrical schematic that is equivalent to the schematic shown in FIG. 3D. The schematic shown in FIG. 3F is a convenient way to represent the preferred circuit configuration of the heaters 332, 334.

As shown in FIG. 3F, the electrical resistance between terminals 386 and 370 is R1. It will be appreciated that R1 is equal to the series combination of resistances RA and RC (i.e., the sum of the resistances provided by heater elements 350 and 380). As also shown in FIG. 3F, the electrical resistance between terminals 396 and 370 is equal to R2. It will further be appreciated that R2 is equal to the series combination of resistances RB and RD (i.e., the sum of the resistances provided by the heater elements 360 and 390). Normally, RC and RA are selected to be equal, although this is not necessary. Similarly, RB and RD are normally selected to be equal, although this is also not necessary. The resistances of heaters configured according to the invention are preferably selected so that R1 is not equal to R2.

It will be appreciated from FIGS. 3A–3F that heater 330 may be considered as providing two heating elements, a first heating element disposed between terminals 386 and 370 (and providing an electrical resistance of R1) and a second heating element disposed between terminals 396 and 370 (and providing an electrical resistance of R2). In the embodiment shown in FIGS. 3A–3F, the heating element disposed between terminals 386 and 370 is of course provided by two distinct elements (element 350 in the barrel heater and element 380 in the end heater) and similarly, the heating element disposed between terminals 396 and 370 is of course provided by two distinct elements (element 360 in the barrel heater and element 390 in the end heater). However, this is not necessary. That is, in alternative embodiments of heater 330, the heating element provided between terminals 386 and 370 could include one or more distinct heating elements and the heating element provided between terminals 396 and 370 could also include one or more distinct heating elements.

Figure 4:
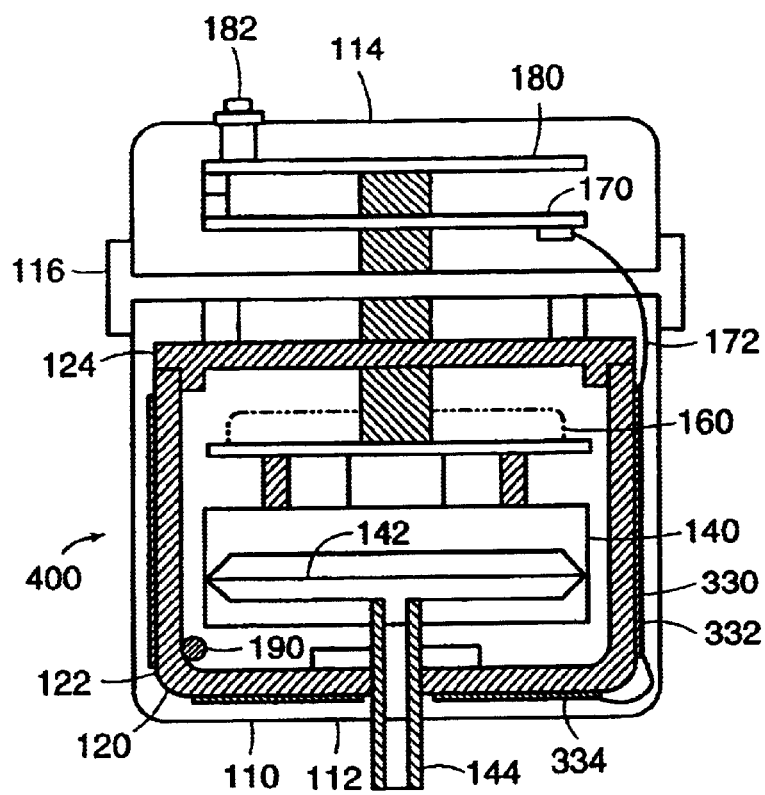
FIG. 4 shows a sectional view of a heated capacitive pressure transducer constructed according to the invention.

FIG. 4 shows a sectional view of a pressure transducer 400 constructed according to the invention. The principal difference between transducer 400 and prior art transducer 100 (shown in FIG. 1) is that in transducer 400, prior art heater 130 has been replaced with the improved heater 330. More specifically, prior art heater 132 has been replaced with barrel heater 332 and prior art heater 134 has been replaced with end heater 334.

Figure 5A:
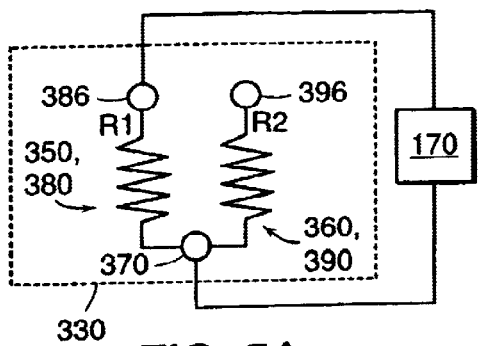
FIG. 5A shows an electrical schematic for connecting two of the heater elements of the heaters shown in FIGS. 3A and 3C in series between two terminals of the circuitry of the pressure transducer shown in FIG. 4.
Figure 5B:
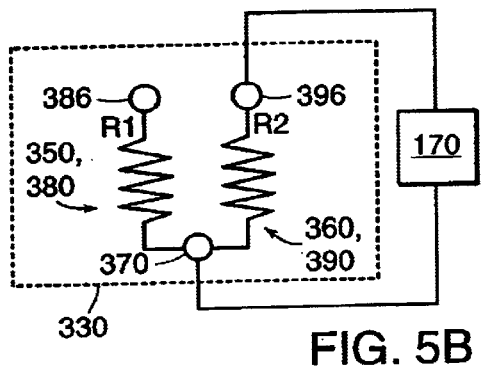
FIG. 5B shows an electrical schematic for connecting two other heater elements of the heaters shown in FIGS. 3A and 3C in series between two terminals of the circuitry of the pressure transducer shown in FIG. 4.
Figure 5C:
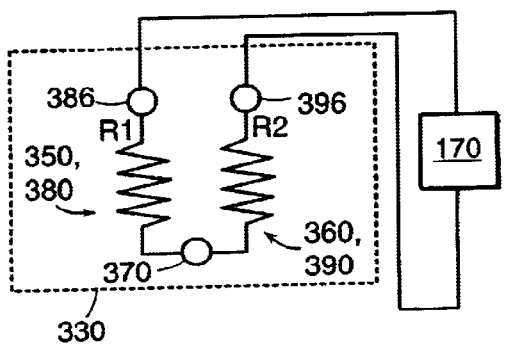
FIG. 5C shows an electrical schematic for connecting all of the heater elements of the heaters shown in FIGS. 3A and 3C in series between two terminals of the circuitry of the pressure transducer shown in FIG. 4.
Figure 5D:
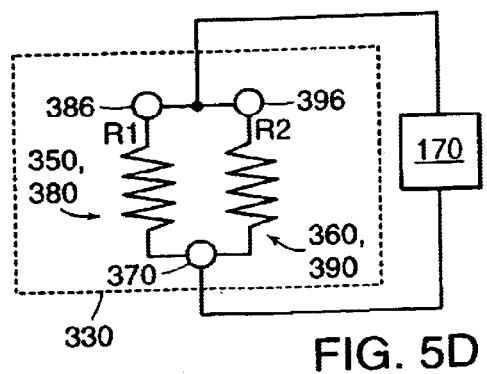
FIG. 5D shows an electrical schematic for connecting the heater elements of the heaters shown in FIGS. 3A and 3C in parallel between two terminals of the circuitry of the pressure transducer shown in FIG. 4.

FIGS. 5A–5D illustrate different ways in which heater 330 may be electrically connected to heater control electronics circuitry 170 of pressure transducer 400. As shown in FIG. 5A, elements 350, 380 may be electrically connected between two terminals of heater control electronic assembly 170. In this configuration, elements 360, 390 are unused and the electrical resistance provided by heater 330 is equal to R1 (i.e., the series electrical resistance of elements 350, 380). As shown in FIG. 5B, elements 360, 390 may be electrically connected between two terminals of heater control electronic assembly 170. In this configuration, elements 350, 380 are unused and the electrical resistance provided by heater 330 is equal to R2 (i.e., the series electrical resistance of elements 360, 390). As shown in FIG. 5C, elements 350, 380, 360, 390 may be all connected in series between two terminals of heater control electronic assembly 170. In this configuration, the electrical resistance provided by heater 330 is equal to R1 plus R2 (i.e., the sum of the resistances of elements 350, 380, 360, 390). Finally, as shown in FIG. 5D, the elements providing a resistance of R1 (i.e., elements 350, 380) and the elements providing a resistance of R2 (i.e., elements 360, 390) may be connected in parallel between two terminals of heater control electronic assembly 170. In this configuration, the electrical resistance provided by heater 330 is equal to R1 times R2 divided by the sum of R1 and R2 and is accordingly less than R1 and R2. In summary, as shown in FIGS. 5A–5D, the elements of heater 330 may be connected four different ways between the same two terminals of heater control electronic assembly 170 so as to selectively provide any of four different electrical resistances between the terminals.

When fixed voltage signals (e.g., a pulse width modulated signal that swings between two fixed voltages) are applied to a heater element, the amount of heat generated by the element is principally determined by the electrical resistance of the element and the duty cycle of the pulse width modulated signal. Since heater 330 may be coupled to heater control electronic assembly 170 so as to provide four different electrical resistances, heater 330 may be used to selectively heat a heater shell to four different operating temperatures. Heating the heater shell to a particular, stable temperature of course has the result of heating the temperature sensitive pressure sensor and front end electronics to that temperature. So, heater 330 may be used to heat the pressure sensor and front end electronics of transducer 400 to four different stable operating temperatures. For convenience of exposition, providing a transducer with a particular operating temperature shall be discussed in terms of heating the heater shell to that temperature. It will be understood that heating the shell to a particular operating temperature has the effect of heating the pressure sensor and front end electronics to that temperature.

Figure 6:
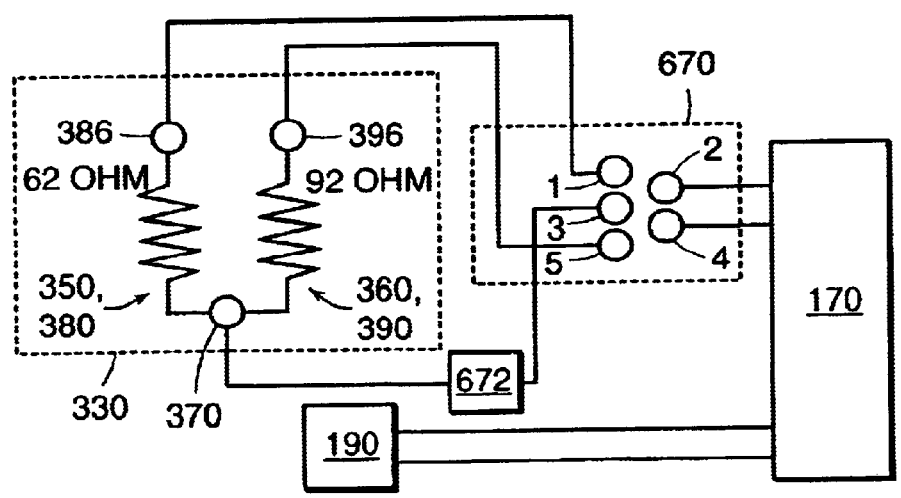
FIG. 6 shows an electrical schematic of a preferred embodiment of a heater constructed according to the invention and a switching element for connecting the heater to the circuitry of a pressure transducer according to the invention.

FIG. 6 shows one preferred embodiment of heater 330 and a preferred method of electrically connecting heater 330 to pressure transducer 400. In this embodiment, heater 330 provides an electrical resistance of sixty-two Ohms between terminals 386 and 370 (i.e., the resistance provided by the series combination of elements 350, 380 is sixty-two Ohms) and provides an electrical resistance of ninety-two Ohms between terminals 396 and 370 (i.e., the resistance provided by the series combination of elements 360, 390 is ninety-two Ohms). Elements 350, 380 provide a one hundred degree Celsius heater, and elements 360, 390 provide an eighty degree Celsius heater. Elements 350, 380 generate a temperature of one hundred degrees Celsius when a pulse width modulated voltage signal that swings between plus and minus fifteen volts is applied to terminals 386 and 370. Elements 360, 390 generate a temperature of eighty degrees Celsius when a pulse width modulated voltage signal that swings between plus and minus fifteen volts is applied to terminals 396 and 370.

As shown in FIG. 6, a switching element 670 is used to connect heater 330 to heater control electronic assembly 170. Terminal 386 of heater 330 is electrically connected to pin 1 of switching element 670. Terminal 396 of heater 330 is electrically connected to pin 5 of switching element 670. Terminal 370 of heater 330 is electrically to one terminal of a thermal fuse 672. The other terminal of fuse 672 is connected to pin 3 of switching element 670. Two wires of heater control electronics assembly 170 are connected to pins 2 and 4 of switching element 670. Two other wires of heater control electronics assembly 170 are connected to temperature sensor 190.

In operation, heater control electronics assembly 170 applies a pulse width modulated voltage signal that swings between plus and minus fifteen volts to terminals 2 and 4 of switching element 670. Heater control electronics assembly 170 monitors the temperature of the heater shell of transducer 400 via temperature sensor 190. Heater control electronics assembly 170 may also modify the duty cycle of the signal applied to terminals 2 and 4 in accordance with the temperature of the heater shell of transducer 400 as measured by sensor 190. Thermal fuse 672 is used to protect the heater elements of heater 330 and is preferably selected to "blow" (or to become non-conductive) if the temperature of the fuse exceeds a selected temperature (e.g., one hundred twelve degrees Celsius).

In one configuration, switching element 670 is configured so as to electrically connect (a) pins 1 and 2 of switching element 670 together and (b) pins 3 and 4 of switching element 670 together. In this configuration, heater elements 350, 380 are connected in series between pins 2 and 4 of switching element 670 and heater elements 360, 390 are unused In operation, this configuration will heat the heater shell of transducer 400 to a stable operating temperature of one hundred degrees Celsius.

In another configuration, switching element 670 is configured so as to electrically connect (a) pins 4 and 5 of switching element 670 together and (b) pins 2 and 3 of switching element 670 together. In this configuration, heater elements 360, 390 are connected in series between pins 2 and 4 of switching element 670 and heater elements 350, 380 are unused. In operation, this configuration will heat the heater shell of transducer 400 to a stable operating temperature of eighty degrees Celsius.

In another configuration, switching element 670 is configured so as to electrically connect (a) pins 1 and 2 of switching element 670 together and (b) pins 4 and 5 of switching element together. In this configuration, heater elements 350, 380, 360, 390 are all connected together in series between pins 2 and 4 of switching element 670. In operation, this configuration will heat the heater shell of transducer 400 to a stable operating temperature of forty-five degrees.

So, transducer 400 may be configured as a one hundred degree Celsius transducer, an eighty degree Celsius transducer, or a forty-five degree Celsius transducer. Also, the operating temperature of the transducer may be easily changed simply by reconfiguring the switching element 670.

It will be appreciated that switching element 670 may be implemented in different ways all of which are embraced by the invention. For example, element 670 may be implemented as a mechanical connector. In this embodiment, the electrical connectivity of the element may be determined by manually configurable, electrically conducting, jumper pins applied to the terminals of the element 670. For example, an electrically conductive jumper pin, or wire, may be connected to terminals 1 and 2 of connector 670 and another electrically conductive jumper pin, or wire, may be connected to terminals 3 and 4 of connector 670, and this configuration will heat the heater shell of transducer 400 to one hundred degrees Celsius. The jumper pins may of course be reconfigured to alter the electrical connection between the heater 330 and the heater control electronics assembly 170 and thereby change the operating temperature of the transducer. This embodiment of switching element 670 is advantageous because it is simple and inexpensive to implement and because it allows the operating temperature of a pressure transducer to be changed by simply moving some electrically connecting jumper pins.

In another embodiment, switching element 670 may be implemented as an electronically controlled switch (e.g., using a transistor based circuit). Such an embodiment is "programmable" in that the operating temperature of the transducer can be selected by applying electronic configuration or programming signals to the switching element 670. The programming signals for switching element 670 can, for example, be generated externally or by heater control electronics assembly 170. One advantage of electronically controlled embodiments of switching element 670 is that they allow the transducer 400 to dynamically reconfigure the electrical resistance provided by the heater.

One advantageous use of an electronically controlled switching element 670 is to decrease the "warm up" time of a pressure transducer (i.e., decrease the time required to raise the temperature of the heater shell from the temperature of the ambient environment to the operating temperature). When a heated pressure transducer is initially powered up, reliable operation does not begin until the heater shell has been heated to its operating temperature. Prior art T1 transducers are "warmed up" (or have their heater shells heated to a temperature of T1 degrees) by activating a T1 degree heater fixed to the heater shell and waiting until that heater raises the temperature the heater shell to T1 degrees. In contrast to the prior art, pressure transducers constructed according to the invention may use a T2 degree heater to raise the temperature of the heater shell from the ambient temperature to T1 degrees and then use a T1 degree heater to maintain the heater shell at T1 degrees. When T2 is higher than T1, this will typically decrease the warm up time of the transducer.

To illustrate the faster warm up concept, an example of using a one hundred degree heater to decrease the warm up time for a forty-five degree transducer will now be discussed in connection with FIG. 6. In this example, heater control electronics assembly 170 initially controls switching element 670 to electrically connect the 62 Ohm, one hundred degree, heating element (i.e., formed by elements 350, 380) between terminals 2 and 4 of element 670. The transducer then uses heating elements 350, 380 (a one hundred degree heater) to heat the heater shell from the temperature of the ambient environment to forty-five degrees. When heater control electronics assembly detects via sensor 190 that the heater shell has been heated to forty-five degrees, then heater control electronics assembly reconfigures switching element 670 to connect heating elements 350, 380, 360, 390 in series (the forty-five degree heater) with terminals 2 and 4 of the switching element 670. Thereafter, the transducer uses the forty-five degree heater (formed by connecting pins 1 and 2 of switching element 670 together and by connecting pins 4 and 5 of switching element together) to maintain the temperature of the transducer at forty-five degrees.

Figure 7A:
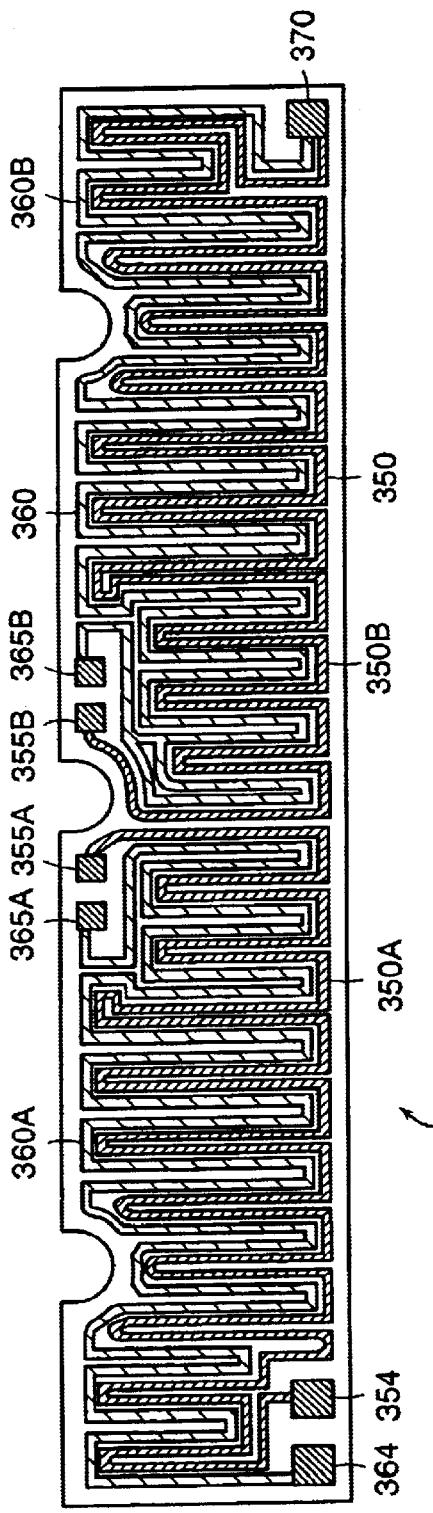
FIG. 7A shows a preferred embodiment of a barrel heater constructed according to the invention.
Figure 7B:
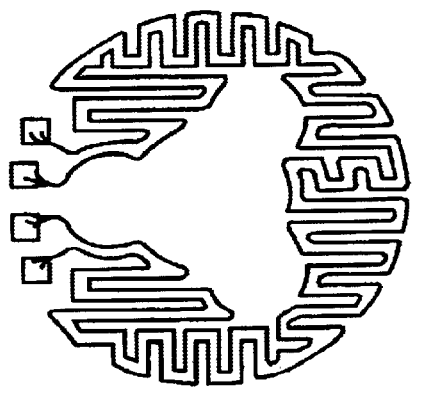
FIG. 7B shows a preferred embodiment of an end heater constructed according to the invention.

FIGS. 7A and 7B show preferred embodiments of heaters 332 and 334, respectively, constructed according to the invention. The barrel heater 332 shown in FIG. 7A includes two heating elements 350, 360. Heating element 350 includes two elements 350A and 350B. Element 350A extends between terminals 354 and 355A and element 350B extends between terminals 355B and 370. Heating element 360 similarly includes two elements 360A and 360B. Element 360A extends between terminals 364 and 365A and element 360B extends between terminals 365B and 370. In normal operation, elements 350A and 350B are connected in series by a wire that electrically connects terminals 355A and 355B. Similarly, elements 360A and 360B are normally connected in series by a wire that electrically connects terminals 365A and 365B. The wire used to connect terminals 355A and 355B and the wire used to connect terminals 365A and 365B may be passed through a thermal fuse so that both wires are broken, or are rendered non-conductive, if the temperature of the heater gets too high (e.g., above one hundred twelve degrees Celsius).

As shown in FIGS. 7A, and 7B, each heating element on the heaters preferably follows a serpentine path so that the elements extend across a large portion of the heater and the heating elements are interlaced with one another. This insures that the heat generated by each heating element is distributed over a large area of the heater and thereby evenly heats the heater shell.

The heaters discussed herein all include two heating elements, a first element characterized by a first electrical resistance and a second element characterized by a second electrical resistance. However, it will be appreciated that in other embodiments, a heater constructed according to the invention may include more than two heating elements. In such embodiments, all or some of the elements may provide a unique electrical resistance. Such heaters could be used for example to accurately heat a heater shell to more than four different operating temperatures.

The preferred embodiments of transducers disclosed herein include two beaters, namely, a barrel heater and an end heater. It will be appreciated that while use of two separate heaters is preferred it is not necessary to obtain the benefits of the invention. Other embodiments of transducers can be constructed according to the invention using only a single heater, wherein that heater includes at least two heater elements. For example, a transducer could be constructed according to the invention using barrel heater 332 and no end beater, or could alternatively be constructed using end heater 334 and no barrel heater. In either case, the heater used would include two different heater elements. Similarly, yet other embodiments of transducers may be constructed according to the invention using even more than two heaters.

The invention has been discussed thus far in terms of providing a heater that includes at least two heating elements, where each of the heating elements is characterized by a unique electric resistance. However, although not preferred, some benefits of the invention can be obtained by using a heater including two heating elements, where the electric resistances of the two heating elements are equal. For example, with reference to FIGS. 5A–5D it can be seen that if R1 is equal to R2, the heater can still be configured to provide two different electric resistances. If configured as shown in FIGS. 5A, 5B, or 5D, the heater will provide an electric resistance of R1. However, if configured as shown in FIG. 5C, the heater will provide an electric resistance of 2R1. Such a heater can be used to provide a transducer with two operating temperatures.

Transducers constructed according the invention have been discussed in terms of including a heater shell 120 and a heater 330 that is attached to the heater shell. In alternative embodiments of transducers constructed according to the invention, the heater shell and heater can be combined into a single unitary structure. For example, U.S. Pat. No. 6,124,579, which is assigned to Watlow Electric Manufacturing, and which is entitled Molded Polymer Composite Heater, discloses a method of fabricating a composite heater. This method can be used to combine the heater shell and a heater constructed according to the invention into a single structure.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A pressure transducer, including:
   (A) a shell;
   (B) a pressure sensor disposed in the shell;
   (C) a heater attached to the shell, the heater including a first heating element and a second heating element, the first heating element being characterized by a first electrical resistance, the second heating element being characterized by a second electrical resistance;
   (D) one or more electronic components for applying an electrical signal to the heater, the heater generating heat in response to the electrical signal; and
   (E) a switching element for selectively connecting any of: (1) the first and second heating elements in series with the electronic components; (2) the first heating element in series with the electronic components; (3) the second heating elements in series with the electronic components and (4) the first and second heating elements in parallel with the electronic components.

2. A transducer according to claim 1, wherein the first electrical resistance is equal to the second electrical resistance.

3. A transducer according to claim 1, wherein the first electrical resistance is different than the second electrical resistance.

4. A pressure transducer, including:
   (A) a pressure sensor;
   (B) a heated shell disposed around the sensor, the heated shell including a first heating element and a second heating element, the first heating element being characterized by a first electrical resistance, the second heating element being characterized by a second electrical resistance;
   (C) one or more electronic components for applying an electrical signal to the heated shell, the heated shell generating heat in response to the electrical signal; and
   (D) a switching element for selectively connecting any of: (1) the first and second heating elements in series with the electronic components; (2) the first heating element in series with the electronic components; (3) the second heating elements in series with the electronic components and (4) the first and second heating elements in parallel with the electronic components.

5. A transducer according to claim 4, wherein the first electrical resistance is equal to the second electrical resistance.

6. A transducer according to claim 4, wherein the first electrical resistance is different than the second electrical resistance.

7. A transducer according to claim 1, further including an outer housing disposed around the shell.

8. A transducer according to claim 7, wherein the heater is disposed between the outer metallic housing and the shell.

9. A transducer according to claim 4, further including an outer housing disposed around the heated shell.

10. A method of heating a pressure transducer, comprising:
    (A) providing a pressure transducer including a shell, a pressure sensor disposed within the shell, a heater coupled to the shell, the heater including a first resistive heating element and a second resistive heating element, the pressure transducer further including one or more electronic components for supplying power to the heater;
    (B) during a first time interval, connecting the one or more electronic components to a first configuration of the first and second resistive heating elements, the first configuration providing a first electrical resistance; and
    (C) during a second time interval, after the first time interval, connecting the one or more electronic components to a second configuration of the first and second resistive heating elements, the second configuration providing a second electrical resistance, the second electrical resistance being different from the first electrical resistance.

11. A method according to claim 10, at least one of the first and second configurations having the first and second resistive heating elements connected in series.

12. A method according to claim 10, at least one of the first and second configurations having the first and second resistive heating elements connected in parallel.

13. A method according to claim 10, including:
    applying power from the one or more electronic components to both the first and second resistive heating elements during one of the first and second time intervals; and
    applying power from the one or more electronic components to only one of the resistive heating elements during another of the first and second time intervals.

14. A method according to claim 10, further comprising sensing a pressure using a pressure-sensitive diaphragm in the pressure sensor.

15. A method according to claim 10, further comprising increasing a temperature of the shell from a first ambient temperature to a second temperature, greater than the first ambient temperature, and operating the pressure transducer with the shell substantially at the second temperature.

16. A method according to claim 10, further comprising operating the pressure transducer at a first temperature during the first time interval, and operating the pressure transducer at a second temperature during the second time interval, the second temperature being different from the first temperature.

17. A method according to claim 10, further comprising providing an outer housing disposed around the shell.

18. A method according to claim 17, disposing the heater between the shell and the outer housing.

19. A method of heating a pressure transducer, comprising:
    (A) providing a pressure transducer including a shell, a pressure sensor disposed within the shell, and a heater coupled to the shell, the heater including a first resistive heating element and a second resistive heating element, the pressure transducer further including one or more electronic components for supplying power to the heater;
    (B) connecting the first and second resistive heating elements to the one or more electronic components in a first electrical configuration that provides power to both the first and second resistive heating elements, the heater when in the first electrical configuration providing a first electrical resistance; and (C) connecting the first and second resistive heating elements to the one or more electronic components in a second electrical configuration that provides power to both the first and second resistive heating elements, the heater when in the second electrical configuration providing a second electrical resistance, the second electrical resistance being different from the first electrical resistance.

20. A method according to claim 19, the first electrical configuration being a series configuration.

21. A method according to claim 19, the first electrical configuration being a parallel configuration.

22. A method according to claim 19, further comprising connecting the first and second resistive heating elements in the first electrical configuration for a first time interval.

23. A method according to claim 19, further comprising connecting the first and second resistive heating elements in the second electrical configuration for a second time interval.

24. A method according to claim 19, further comprising increasing a temperature of the shell from a first ambient temperature to a second temperature, greater than the first ambient temperature, and operating the pressure transducer with the shell substantially at the second temperature.

25. A method according to claim 19, further comprising operating the pressure transducer at a first temperature during the first time interval, and operating the pressure transducer at a second temperature during the second time interval, the second temperature being different from the first temperature.

* * * * *